US011981339B2

(12) United States Patent
Isoyama et al.

(10) Patent No.: US 11,981,339 B2
(45) Date of Patent: May 14, 2024

(54) VEHICLE-MOUNTED COMMUNICATION SYSTEM, DATA ACQUISITION DEVICE, MANAGEMENT DEVICE, AND MONITORING METHOD

(71) Applicant: Sumitomo Electric Industries, Ltd., Osaka (JP)

(72) Inventors: Yoshikazu Isoyama, Osaka (JP); Yoichi Hata, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 681 days.

(21) Appl. No.: 17/265,816

(22) PCT Filed: Mar. 20, 2019

(86) PCT No.: PCT/JP2019/011692
§ 371 (c)(1),
(2) Date: Feb. 4, 2021

(87) PCT Pub. No.: WO2020/044638
PCT Pub. Date: Mar. 5, 2020

(65) Prior Publication Data
US 2021/0163025 A1 Jun. 3, 2021

(30) Foreign Application Priority Data
Aug. 30, 2018 (JP) ................ 2018-160940

(51) Int. Cl.
*B60W 50/02* (2012.01)
*B60R 16/023* (2006.01)
(Continued)

(52) U.S. Cl.
CPC ..... *B60W 50/0205* (2013.01); *B60R 16/0231* (2013.01); *H04L 12/40* (2013.01);
(Continued)

(58) Field of Classification Search
CPC ...... B60W 50/0205; B60W 2050/0295; B60R 16/0231; H04L 12/40; H04L 2012/40273;
(Continued)

(56) References Cited

U.S. PATENT DOCUMENTS 9,843,594 B1 * 12/2017 Evans ................ H04L 63/1425
10,142,358 B1 * 11/2018 Bajpai .................... H04L 1/201
(Continued)

FOREIGN PATENT DOCUMENTS

EP    2892199 A1 *  7/2015  .......... B60R 16/023
JP    2009-192219 A   8/2009
(Continued)

OTHER PUBLICATIONS

English Translation of the Written Opinion of the International Search Authority for PCT/JP2019/011692; retrieved from Global Dossier website. (Year: 2021).*
(Continued)

*Primary Examiner* — Calvin Cheung
(74) *Attorney, Agent, or Firm* — XSENSUS LLP

(57) ABSTRACT

A vehicle-mounted communication system is mounted in a vehicle and includes a plurality of functional units connected to a control network in the vehicle and a management device connected to a security network in the vehicle. Communication from the control network to the security network is partially limited. The vehicle-mounted communication system further includes a data acquisition device that acquires data transmitted through the control network and transmits the data to the management device. The management device detects an abnormality related to the control network based on the data received from the data acquisition device.

15 Claims, 11 Drawing Sheets

(51) Int. Cl.
*H04L 12/40* (2006.01)
*B60W 50/029* (2012.01)

(52) U.S. Cl.
CPC ............ *B60W 2050/0295* (2013.01); *H04L 2012/40273* (2013.01)

(58) Field of Classification Search
CPC ....... H04L 63/1441; H04L 2012/40215; H04L 12/40169; H04L 63/1408
See application file for complete search history.

(56) References Cited

U.S. PATENT DOCUMENTS

| | | | |
|---|---|---|---|
| 2015/0066239 A1* | 3/2015 | Mabuchi | H04L 12/403 701/1 |
| 2015/0191135 A1 | 7/2015 | Ben Noon et al. | |
| 2015/0191136 A1 | 7/2015 | Ben Noon et al. | |
| 2015/0191151 A1 | 7/2015 | Ben Noon et al. | |
| 2015/0195297 A1 | 7/2015 | Ben Noon et al. | |
| 2016/0381068 A1* | 12/2016 | Galula | G07C 5/0816 726/23 |
| 2017/0200323 A1* | 7/2017 | Allouche | G07C 5/008 |
| 2017/0259784 A1* | 9/2017 | Sasaki | B60R 25/10 |
| 2018/0255072 A1 | 9/2018 | Takada et al. | |
| 2018/0255082 A1* | 9/2018 | Ostergaard | G06N 20/00 |
| 2018/0316721 A1 | 11/2018 | Nakano et al. | |
| 2019/0044912 A1* | 2/2019 | Yang | G06F 21/50 |
| 2019/0141070 A1* | 5/2019 | Tsurumi | B60R 1/00 |
| 2019/0302753 A1 | 10/2019 | Fujii et al. | |

FOREIGN PATENT DOCUMENTS

| | | |
|---|---|---|
| JP | 2013-131907 A | 7/2013 |
| JP | 2015-136107 A | 7/2015 |
| JP | 2017-28410 A | 2/2017 |
| JP | 2017-50644 A | 3/2017 |
| JP | 2017-112590 A | 6/2017 |
| JP | 2018-16106 A | 2/2018 |
| JP | 2018-182713 A | 11/2018 |
| JP | 2019-180005 A | 10/2019 |
| WO | WO-2016151566 A1 * | 9/2016 ............ G06F 21/554 |

OTHER PUBLICATIONS

International Search Report and Written Opinion mailed on May 28, 2019, received for PCT Application PCT/JP2019/011692, Filed on Mar. 20, 2019, 9 pages including English Translation.

* cited by examiner

VEHICLE-MOUNTED COMMUNICATION SYSTEM, DATA ACQUISITION DEVICE, MANAGEMENT DEVICE, AND MONITORING METHOD

CROSS-REFERENCE TO RELATED APPLICATIONS

The present application is based on PCT filing PCT/JP2019/011692, filed Mar. 20, 2019, which claims priority to JP 2018-160940, filed Aug. 30, 2018, the entire contents of each are incorporated herein by reference.

TECHNICAL FIELD

The present invention relates to vehicle-mounted communication systems, data acquisition devices, management devices, and monitoring methods.

BACKGROUND ART

Japanese Unexamined Patent Application Publication No. 2013-131907 (Patent Literature 1) discloses the following vehicle network monitoring device. Specifically, the vehicle network monitoring device is disposed in a vehicle network where data communication is performed between a plurality of vehicle-mounted control devices and monitors the communication data. The vehicle network monitoring device includes a monitoring unit that detects illegal data through monitoring with a data communication format defined for putting into practice a communication protocol used in the vehicle network.

Japanese Unexamined Patent Application Publication No. 2017-112590 (Patent Literature 2) discloses the following communication device. Specifically, the communication device includes a communication unit that exchanges messages in a network and a first illegality detector that detects an illegal message by detecting values of a plurality of monitoring items from a message received in the communication unit and determining whether or not each of the detection values of the plurality of monitoring items is within a corresponding reference range. For each of the plurality of monitoring items, a first reference range and a second reference range smaller than the first reference range are set. The first illegality detector determines that the message is an illegal message when any of the detection values is outside the first reference range, and determines that the message is an illegal message if a predetermined rule is satisfied when any of the detection values is within the first reference range but outside the second reference range.

CITATION LIST

Patent Literature

PTL 1: Japanese Unexamined Patent Application Publication No. 2013-131907
PTL 2: Japanese Unexamined Patent Application Publication No. 2017-112590

SUMMARY OF INVENTION (1) A vehicle-mounted communication system according to the present disclosure is mounted in a vehicle. The vehicle-mounted communication system includes a plurality of functional units connected to a control network in the vehicle, and also includes a management device connected to a security network in the vehicle. Communication from the control network to the security network is partially limited. The vehicle-mounted communication system further includes a data acquisition device that acquires data transmitted through the control network and transmits the data to the management device. The management device detects an abnormality related to the control network based on the data received from the data acquisition device.

(8) A vehicle-mounted communication system according to the present disclosure is mounted in a vehicle. The vehicle-mounted communication system includes a plurality of functional units connected to a control network in the vehicle, and also includes a data acquisition device that is communicable with a management device connected to a security network in the vehicle and that acquires data transmitted through the control network. Communication from the control network to the security network is partially limited. The data acquisition device is a connector that connects between paths in the control network and detects an abnormality related to the control network based on the acquired data.

(9) A data acquisition device according to the present disclosure is a data acquisition device in a vehicle-mounted communication system mounted in a vehicle, the vehicle-mounted communication system having a plurality of functional units connected to a control network and a management device connected to a security network. Communication from the control network to the security network is partially limited. The data acquisition device includes an acquisition unit that acquires data transmitted through the control network, and also includes a transmitter that transmits the data acquired by the acquisition unit to the management device.

(12) A management device according to the present disclosure is a management device in a vehicle-mounted communication system mounted in a vehicle, the management device being connected to a security network. In the vehicle, a plurality of functional units are connected to a control network and communication from the control network to the security network is partially limited. The management device includes a communication unit that acquires data transmitted through the control network, and also includes a processor that detects an abnormality related to the control network based on the data acquired by the communication unit.

(13) A monitoring method according to the present disclosure is a monitoring method in a vehicle-mounted communication system mounted in a vehicle, the vehicle-mounted communication system including a plurality of functional units connected to a control network in the vehicle and a management device connected to a security network in the vehicle. Communication from the control network to the security network is partially limited. The monitoring method includes a step for acquiring data transmitted through the control network, a step for transmitting the acquired data to the management device, and a step performed by the management device for detecting an abnormality related to the control network based on the received data.

(14) A monitoring method according to the present disclosure is a monitoring method in a vehicle-mounted communication system mounted in a vehicle, the vehicle-mounted communication system including a plurality of functional units connected to a control network in the vehicle and a data acquisition device communicable with a management device connected to a security network in the vehicle. Communication from the control network to the security network is partially limited. The data acquisition device is a connector that connects between paths in the control network. The monitoring method includes a step performed by the data acquisition device for acquiring data transmitted through the control network, and a step performed by the data acquisition device for detecting an abnormality related to the control network based on the acquired data.

An aspect of the present disclosure may be realized not only as a vehicle-mounted communication system equipped with such a characteristic processor, but also as a program for causing a computer to execute such characteristic processing steps. Furthermore, an aspect of the present disclosure may be realized as a semiconductor integrated circuit that partially or entirely realizes the vehicle-mounted communication system.

An aspect of the present disclosure may be realized not only as a data acquisition device equipped with such a characteristic processor, but also as a method including such characteristic processing steps or a program for causing a computer to execute such steps. Moreover, an aspect of the present disclosure may be realized as a semiconductor integrated circuit that partially or entirely realizes the data acquisition device.

An aspect of the present disclosure may be realized not only as a management device equipped with such a characteristic processor, but also as a method including such characteristic processing steps or a program for causing a computer to execute such steps. Moreover, an aspect of the present disclosure may be realized as a semiconductor integrated circuit that partially or entirely realizes the management device.

DESCRIPTION OF EMBODIMENTS

Figure 1:
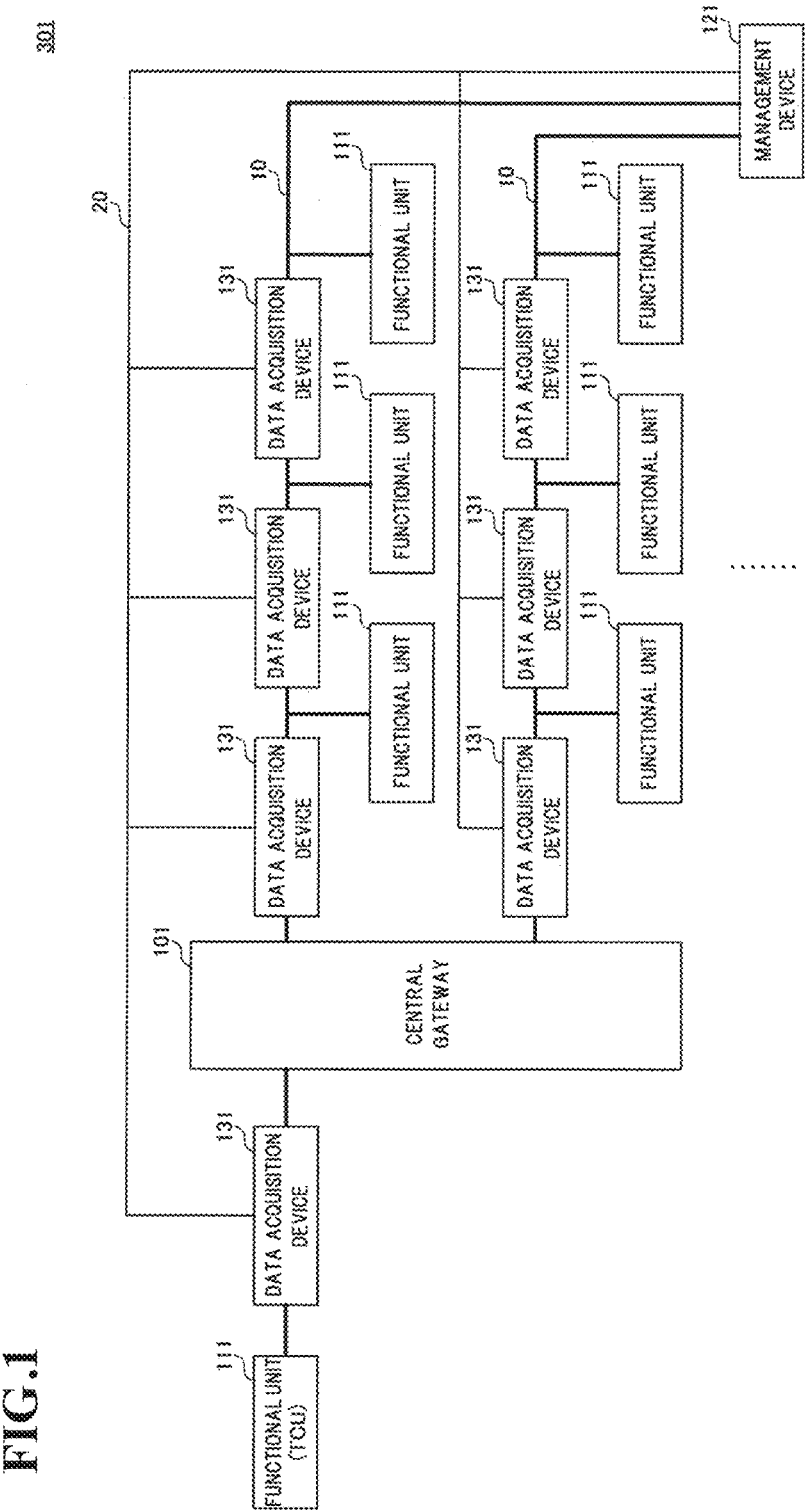
FIG. 1 illustrates an example of the configuration of a vehicle-mounted communication system according to a first embodiment of the present invention.

In the related art, a vehicle-mounted network system that detects illegal communication in a vehicle-mounted network has been developed.

Problems to be Solved by Present Disclosure

There is a demand for a technology that can establish a vehicle-mounted network with improved security over the technologies described in Patent Literature 1 and Patent Literature 2.

The present disclosure has been made for solving the aforementioned problems, and an object thereof is to provide a vehicle-mounted communication system, a data acquisition device, a management device, and a monitoring method that can establish a vehicle-mounted network with improved security.

Advantages of Present Disclosure

According to the present disclosure, a vehicle-mounted network with improved security can be established.

Description of Embodiments of Present Invention

First, the following description relates to a list of contents for embodiments of the present invention.

(1) A vehicle-mounted communication system according to an embodiment of the present invention is mounted in a vehicle and includes a plurality of functional units connected to a control network in the vehicle and a management device connected to a security network in the vehicle. Communication from the control network to the security network is partially limited. The vehicle-mounted communication system further includes a data acquisition device that acquires data transmitted through the control network and transmits the data to the management device. The management device detects an abnormality related to the control network based on the data received from the data acquisition device.

Accordingly, the communication is limited by isolating the control network for transmitting information between the functional units and the security network for monitoring from each other, thereby detecting an abnormality in the vehicle while achieving improved security by using the security network in which the effect of the abnormality in the control network is minimized. Consequently, a vehicle-mounted network with improved security can be established.

(2) Preferably, the data acquisition device performs control related to the control network when an abnormality is detected by the management device.

According to this configuration, for example, transmission of illegal data through the control network can be prevented, thereby reducing the effect of the abnormality.

(3) Preferably, the data acquisition device performs control for cutting off each functional unit from the control network when the abnormality is detected by the management device.

According to this configuration, transmission paths for illegal data can be blocked. For example, transmission of illegal data from the functional unit detected as being abnormal through the control network can be prevented, and reception of illegal data by a normal functional unit can be prevented.

(4) Preferably, the data acquisition device performs control for switching paths in the control network when the abnormality is detected by the management device.

According to this configuration, for example, another transmission path is used in place of the transmission path corresponding to the detected abnormality, so that the vehicle-mounted communication system can continue to perform normal operation.

(5) Preferably, the management device controls each functional unit when the abnormality is detected.

According to this configuration, for example, the operation of the functional unit detected as being abnormal can be stopped, or the operation of a normal functional unit can be stopped to prevent the functional unit from receiving illegal data, so that the effect of the abnormality can be reduced.

(6) Preferably, the management device changes operation of each functional unit toward a safer side for running of the vehicle when the abnormality is detected.

According to this configuration, a malfunction of a functional unit caused as a result of receiving illegal data can be suppressed, thereby ensuring stable running of the vehicle.

(7) Preferably, the management device performs control for providing a notification about the abnormality when the abnormality is detected.

According to this configuration, for example, the driver of the vehicle can recognize that inoperability is caused by an abnormality in the control network, so as to be able to ascertain the situation in detail.

(8) A vehicle-mounted communication system according to an embodiment of the present invention is mounted in a vehicle, and also includes a plurality of functional units connected to a control network in the vehicle and a data acquisition device that is communicable with a management device connected to a security network in the vehicle and that acquires data transmitted through the control network. Communication from the control network to the security network is partially limited. The data acquisition device is a connector that connects between paths in the control network and detects an abnormality related to the control network based on the acquired data.

Accordingly, the communication is limited by isolating the control network for transmitting information between the functional units and the security network for monitoring from each other, thereby detecting an abnormality in the vehicle while achieving improved security by using the security network in which the effect of the abnormality in the control network is minimized. Moreover, the data acquisition device can be readily retrofitted to, for example, a vehicle-mounted communication system equipped with existing functional units, and the functional units can be simplified. Consequently, a vehicle-mounted network with improved security can be established.

(9) A data acquisition device according to an embodiment of the present invention is a data acquisition device in a vehicle-mounted communication system mounted in a vehicle, the vehicle-mounted communication system having a plurality of functional units connected to a control network and a management device connected to a security network. Communication from the control network to the security network is partially limited. The data acquisition device includes an acquisition unit that acquires data transmitted through the control network, and also includes a transmitter that transmits the data acquired by the acquisition unit to the management device.

Accordingly, the communication is limited by isolating the control network for transmitting information between the functional units and the security network for monitoring from each other, thereby detecting an abnormality in the vehicle while achieving improved security by using the security network in which the effect of the abnormality in the control network is minimized. Consequently, a vehicle-mounted network with improved security can be established.

(10) Preferably, the data acquisition device is a connector that connects between paths in the control network.

According to this configuration, the data acquisition device can be readily retrofitted to, for example, a vehicle-mounted communication system equipped with existing functional units, and the functional units can be simplified.

(11) Preferably, the data acquisition device is included in each functional unit.

According to this configuration, the configuration of the vehicle-mounted communication system can be simplified.

(12) A management device according to an embodiment of the present invention is a management device in a vehicle-mounted communication system mounted in a vehicle, the management device being connected to a security network. In the vehicle, a plurality of functional units are connected to a control network and communication from the control network to the security network is partially limited. The management device includes a communication unit that acquires data transmitted through the control network, and also includes a processor that detects an abnormality related to the control network based on the data acquired by the communication unit.

Accordingly, the communication is limited by isolating the control network for transmitting information between the functional units and the security network for monitoring from each other, thereby detecting an abnormality in the vehicle while achieving improved security by using the security network in which the effect of the abnormality in the control network is minimized. Moreover, various types of abnormalities can be detected collectively in a single device. Consequently, a vehicle-mounted network with improved security can be established.

(13) A monitoring method according to an embodiment of the present invention is a monitoring method in a vehicle-mounted communication system mounted in a vehicle, the vehicle-mounted communication system including a plurality of functional units connected to a control network in the vehicle and a management device connected to a security network in the vehicle. Communication from the control network to the security network is partially limited. The monitoring method includes a step for acquiring data transmitted through the control network, a step for transmitting the acquired data to the management device, and a step performed by the management device for detecting an abnormality related to the control network based on the received data.

Accordingly, the communication is limited by isolating the control network for transmitting information between the functional units and the security network for monitoring from each other, thereby detecting an abnormality in the vehicle while achieving improved security by using the security network in which the effect of the abnormality in the control network is minimized. Consequently, a vehicle-mounted network with improved security can be established.

(14) A monitoring method according to an embodiment of the present invention is a monitoring method in a vehicle-mounted communication system mounted in a vehicle, the vehicle-mounted communication system including a plurality of functional units connected to a control network in the vehicle and a data acquisition device communicable with a management device connected to a security network in the vehicle. Communication from the control network to the security network is partially limited. The data acquisition device is a connector that connects between paths in the control network. The monitoring method includes a step performed by the data acquisition device for acquiring data transmitted through the control network, and a step performed by the data acquisition device for detecting an abnormality related to the control network based on the acquired data.

Accordingly, the communication is limited by isolating the control network for transmitting information between the functional units and the security network for monitoring from each other, thereby detecting an abnormality in the vehicle while achieving improved security by using the security network in which the effect of the abnormality in the control network is minimized. Moreover, the data acquisition device can be readily retrofitted to, for example, a vehicle-mounted communication system equipped with existing functional units, and the functional units can be simplified. Consequently, a vehicle-mounted network with improved security can be established.

Embodiments of the present invention will be described below with reference to the drawings. In the drawings, identical or equivalent sections will be given the same reference signs, and the descriptions thereof will not be repeated. Moreover, at least a part of the embodiments to be described below may be arbitrarily combined.

First Embodiment

[Configuration and Basic Operation]

FIG. 1 illustrates an example of the configuration of a vehicle-mounted communication system according to a first embodiment of the present invention.

Referring to FIG. 1, a vehicle-mounted communication system 301 includes a plurality of functional units 111, a management device 121, and a plurality of data acquisition devices 131. The plurality of functional units 111 include, for example, a central gateway 101 and a TCU (telematics communication unit).

The vehicle-mounted communication system 301 is mounted in a vehicle 1. The plurality of functional units 111 excluding the central gateway 101 are connected to the central gateway 101 by a control network 10, such as a CAN (controller area network) (registered trademark) bus compliant with the CAN standard or an Ethernet (registered trademark) cable.

Furthermore, each of the functional units 111 is, for example, an automated driving ECU (electronic control unit), a driving support device, or a sensor, and is capable of communicating with another functional unit 111 via the central gateway 101.

For example, the central gateway 101 relays information between functional units 111, excluding the central gateway 101, connected to different control networks 10.

The central gateway 101 and the functional units 111 communicate with each other via the control network 10. For example, control information for controlling the various types of functional units 111 is exchanged between the central gateway 101 and the functional units 111.

Each of the data acquisition devices 131 is connected between functional units 111 excluding the central gateway 101 or between the central gateway 101 and another functional unit 111.

The management device 121 is connected to the data acquisition devices 131 by a security network 20.

Communication from the control network 10 to the security network 20 is partially limited. Specifically, data created by one functional unit 111 can be transmitted therefrom to another functional unit 111 via the control network 10 but cannot be transmitted to the management device 121 via the security network 20.

Each data acquisition device 131 acquires data transmitted through the control network 10 and transmits the data to the management device 121.

Figure 2:
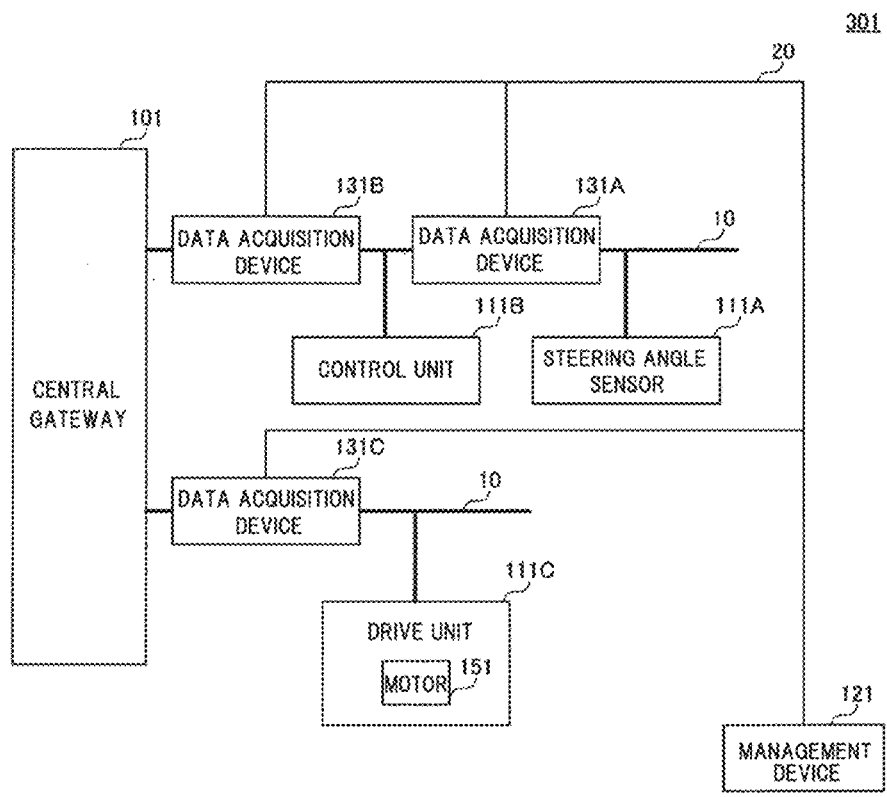
FIG. 2 illustrates an example of a partial configuration of the vehicle-mounted communication system according to the first embodiment of the present invention.

FIG. 2 illustrates an example of a partial configuration of the vehicle-mounted communication system according to the first embodiment of the present invention. FIG. 2 illustrates a power steering function for assisting with the steering operation of the vehicle 1.

Referring to FIG. 2, a steering angle sensor 111A, a control unit 111B, and the central gateway 101 as examples of the functional units 111 are connected to one another by the control network 10.

Furthermore, the central gateway 101 and a drive unit 111C as examples of the functional units 111 are connected to each other by the control network 10. The drive unit 111C has a motor 151 for assisting with the steering operation.

Moreover, a data acquisition device 131A is connected between the steering angle sensor 111A and the control unit 111B. A data acquisition device 131B is connected between the control unit 111B and the central gateway 101. A data acquisition device 131C is connected between the central gateway 101 and the drive unit 111C.

The steering angle sensor 111A detects, for example, the angular velocity of the steering angle in the steering operation and the direction of the steering operation, and transmits sensor information indicating the detected angular velocity and the detected direction to the control unit 111B via the data acquisition device 131A.

For example, the control unit 111B calculates a power-steering assistance amount based on the sensor information received from the steering angle sensor 111A via the data acquisition device 131A, and creates control information containing the direction, the motor speed, and the drive amount for controlling the rotation of the motor 151 based on the calculated assistance amount.

Then, the control unit 111B transmits the created control information to the drive unit 111C via the data acquisition device 131B, the central gateway 101, and the data acquisition device 131C.

For example, the drive unit 111C controls the rotation of the motor 151 included therein based on the control information received from the control unit 111B via the data acquisition device 131B, the central gateway 101, and the data acquisition device 131C.

Figure 3:
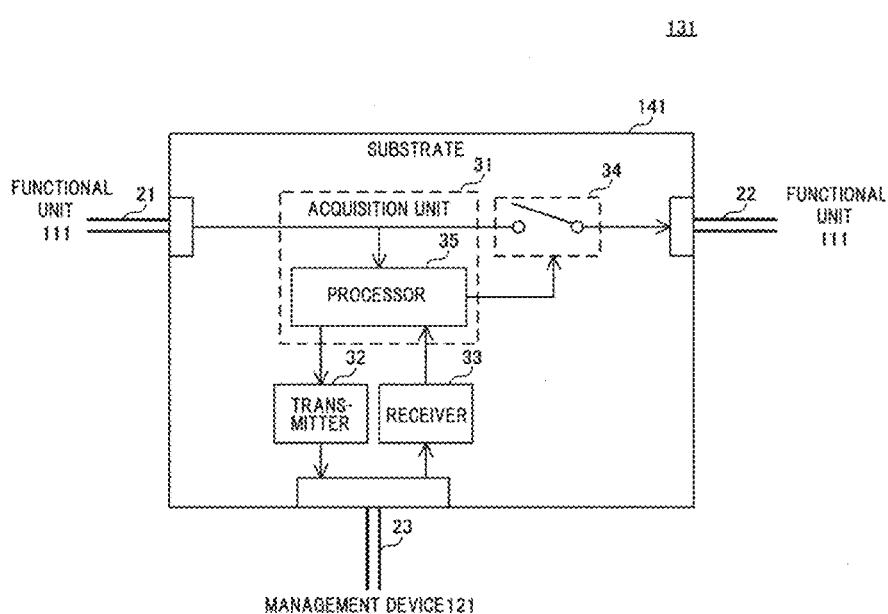
FIG. 3 illustrates an example of the configuration of each data acquisition device according to the first embodiment of the present invention.

FIG. 3 illustrates an example of the configuration of each data acquisition device according to the first embodiment of the present invention.

Referring to FIG. 3, the data acquisition device 131 is, for example, a connector that connects between paths in the control network 10.

More specifically, the data acquisition device 131 includes an acquisition unit 31, a transmitter 32, a receiver 33, and a switch 34. The acquisition unit 31 includes a processor 35. The acquisition unit 31, the transmitter 32, the receiver 33, and the switch 34 are mounted on, for example, a substrate 141.

The substrate 141 is connected to the functional units 111 or the central gateway 101 by wire harnesses 21 and 22 used as the control network 10, and is connected to the management device 121 by a wire harness 23 used as the security network 20.

Referring to FIGS. 2 and 3, the acquisition unit 31 in the data acquisition device 131A acquires sensor information transmitted through the control network 10.

In detail, the sensor information transmitted from the steering angle sensor 111A is transmitted to the control unit 111B via the wire harness 21, the switch 34, and the wire harness 22 in the data acquisition device 131A.

The switch 34 in the data acquisition device 131A is connected between the wire harness 21 and the wire harness 22.

The switch 34 switches between a connected mode and a non-connected mode between the wire harness 21 and the wire harness 22 in accordance with control of the processor 35.

In the normal state, the processor 35 turns on the switch 34 to connect the wire harness 21 and the wire harness 22 to each other. Accordingly, the sensor information from the wire harness 21 is transmitted to the wire harness 22.

The acquisition unit 31 in the data acquisition device 131A acquires, for example, the sensor information transmitted through the data acquisition device 131A between the wire harness 21 and the switch 34, and outputs the acquired sensor information to the transmitter 32.

The acquisition unit 31 in the data acquisition device 131B acquires the control information transmitted through the control network 10.

In detail, the control information transmitted from the control unit 111B is transmitted to the central gateway 101 via the wire harness 21, the switch 34, and the wire harness 22 in the data acquisition device 131B.

The switch 34 in the data acquisition device 131B is connected between the wire harness 21 and the wire harness 22.

The switch 34 switches between a connected mode and a non-connected mode between the wire harness 21 and the wire harness 22 in accordance with control of the processor 35.

In the normal state, the processor 35 turns on the switch 34 to connect the wire harness 21 and the wire harness 22 to each other. Accordingly, the control information from the wire harness 21 is transmitted to the wire harness 22.

The acquisition unit 31 in the data acquisition device 131B acquires, for example, the control information transmitted through the data acquisition device 131B between the wire harness 21 and the switch 34, and outputs the acquired control information to the transmitter 32.

The transmitter 32 transmits the data acquired by the acquisition unit 31 to the management device 121.

More specifically, the transmitter 32 in the data acquisition device 131A transmits the sensor information received from the acquisition unit 31 to the management device 121 via the wire harness 23 used as the security network 20.

The transmitter 32 in the data acquisition device 131B transmits the control information received from the acquisition unit 31 to the management device 121 via the wire harness 23.

Furthermore, the data acquisition device 131C acquires control information transmitted to the drive unit 111C via the central gateway 101 and transmits the acquired control information to the management device 121.

The management device 121 detects an abnormality related to the control network 10 based on data received from the data acquisition devices 131.

More specifically, the management device 121 receives the sensor information transmitted from the data acquisition device 131A and the control information transmitted from the data acquisition device 131B, and detects an abnormality in the steering angle sensor 111A, the control unit 111B, and the drive unit 111C based on the received pieces of information.

Figure 4:
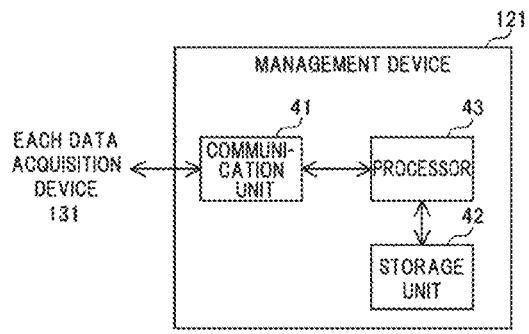
FIG. 4 illustrates an example of the configuration of a management device in the vehicle-mounted communication system according to the first embodiment of the present invention.

FIG. 4 illustrates an example of the configuration of the management device in the vehicle-mounted communication system according to the first embodiment of the present invention.

Referring to FIG. 4, the management device 121 includes a communication unit 41, a storage unit 42, and a processor 43.

[Abnormality Detection Example 1]

The communication unit 41 acquires data transmitted through the control network.

More specifically, the communication unit 41 receives sensor information transmitted from the data acquisition device 131A and stores the received sensor information in the storage unit 42. Moreover, the communication unit 41 receives control information transmitted from the data acquisition device 131B and stores the received control information in the storage unit 42.

Figure 5:
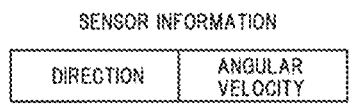
FIG. 5 illustrates an example of sensor information in the vehicle-mounted communication system according to the first embodiment of the present invention.

FIG. 5 illustrates an example of sensor information in the vehicle-mounted communication system according to the first embodiment of the present invention.

Referring to FIG. 5, the sensor information is constituted of a direction field and an angular velocity field in that order from the head.

The direction field has stored therein a value indicating the direction of a steering angle detected by the steering angle sensor 111A. The angular velocity field has stored therein a value indicating the angular velocity of the steering angle detected by the steering angle sensor 111A.

Figure 6:
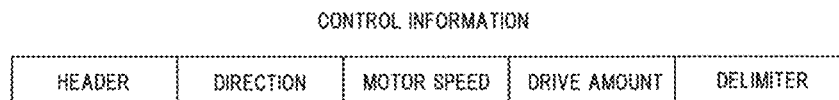
FIG. 6 illustrates an example of control information in the vehicle-mounted communication system according to the first embodiment of the present invention.

FIG. 6 illustrates an example of control information in the vehicle-mounted communication system according to the first embodiment of the present invention.

Referring to FIG. 6, the control information is constituted of a header, a direction field, a motor speed field, a drive amount field, and a delimiter in that order from the head.

The direction field, the motor speed field, and the drive amount field have stored therein values indicating the direction, motor speed, and drive amount, respectively, set by the control unit 111B.

The processor 43 detects an abnormality related to the control network 10 based on data acquired by the communication unit 41.

More specifically, for example, the processor 43 compares the value of the direction field in the sensor information and the value of the direction field in the control information stored in the storage unit 42 with each other to determine whether or not the direction of the steering angle matches the direction of the assistance.

Then, if the processor 43 determines that the direction of the steering angle does not match the direction of the assistance, the processor 43 creates an abnormality notification indicating an abnormality in the control unit 111B, and transmits the created abnormality notification to the data acquisition device 131B, serving as the acquisition source of the control information, via the communication unit 41 and the security network 20.

Figure 7:
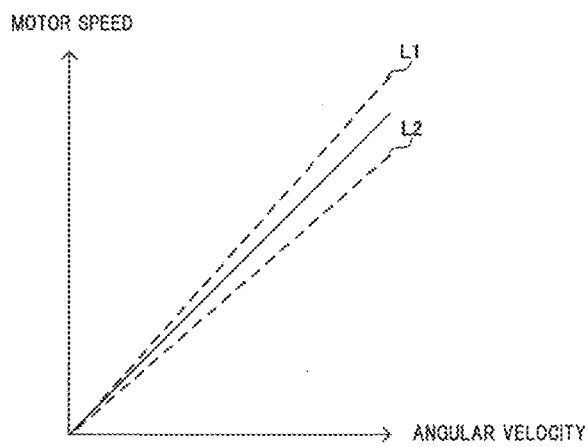
FIG. 7 illustrates an example of the relationship between an angular velocity in sensor information and a motor speed in control information in the vehicle-mounted communication system according to the first embodiment of the present invention.

FIG. 7 illustrates an example of the relationship between an angular velocity in sensor information and a motor speed in control information in the vehicle-mounted communication system according to the first embodiment of the present invention. In FIG. 7, the abscissa axis indicates the angular velocity in the sensor information, whereas the ordinate axis indicates the motor speed in the control information.

Referring to FIG. 7, the relationship between the angular velocity in the sensor information and the motor speed in the control information is a proportional relationship.

For example, if the value of the motor speed field in the control information is not included in a range between an upper limit L1 and a lower limit L2 shown in FIG. 7 relative to the value of the angular velocity field in the sensor information, the processor 43 determines that the control unit 111B is abnormal.

Then, the processor 43 creates an abnormality notification indicating the abnormality in the control unit 111B, and transmits the created abnormality notification to the data acquisition device 131B, serving as the acquisition source of the control information, via the communication unit 41 and the security network 20.

Figure 8:
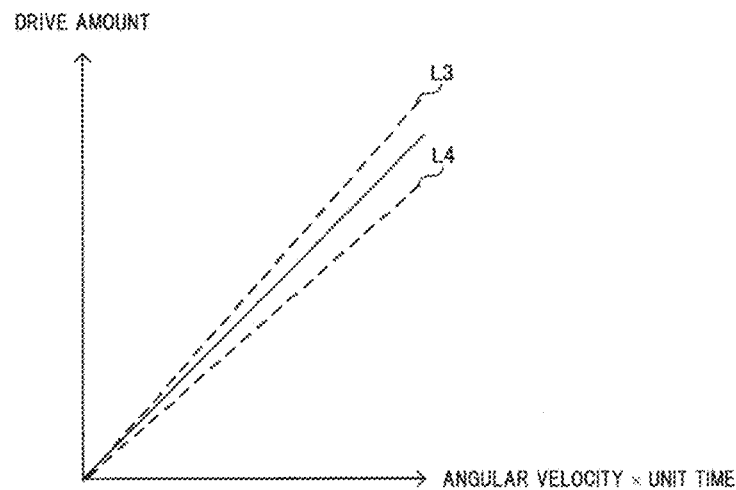
FIG. 8 illustrates an example of the relationship between a drive amount based on a value of an angular velocity field in sensor information and a drive amount in control information in the vehicle-mounted communication system according to the first embodiment of the present invention.

FIG. 8 illustrates an example of the relationship between a drive amount based on a value of the angular velocity field in sensor information and a drive amount in control information in the vehicle-mounted communication system according to the first embodiment of the present invention. In FIG. 8, the abscissa axis indicates the drive amount based on the value of the angular velocity field in the sensor information, whereas the ordinate axis indicates the drive amount in the control information.

Referring to FIG. 8, the relationship between the drive amount based on the value of the angular velocity field in the sensor information, specifically, a value obtained by multiplying the value of the angular velocity field by a unit time period, namely, a predetermined time period, and the drive amount in the control information is a proportional relationship.

When the value of the drive amount field in the control information is not included in a range between an upper limit L3 and a lower limit L4 shown in FIG. 8 relative to the value obtained by multiplying the value of the angular velocity field in the sensor information by the unit time period, namely, the predetermined time period, the processor 43 determines that the control unit 111B is abnormal.

Then, based on the determination result, the processor 43 creates an abnormality notification indicating the abnormality in the control unit 111B, and transmits the created abnormality notification to the data acquisition device 131B, serving as the acquisition source of the control information, via the communication unit 41 and the security network 20.

[Abnormality Detection Example 2]

For example, the processor 43 counts the number of pieces of control information received from the data acquisition device 131B via the communication unit 41 during a predetermined time period.

The number of pieces of control information transmitted from the control unit 111B becomes extremely large when, for example, the control unit 111B is taken over or a DOS attack (denial of service attack) involving transmission of a large volume of illegal data is performed due to the control unit 111B being replaced with an unauthorized functional unit.

For example, when the count value is larger than or equal to a predetermined threshold value, the processor 43 determines that the control unit 111B is abnormal.

Then, the processor 43 creates an abnormality notification indicating the abnormality in the control unit 111B, and transmits the created abnormality notification to the data acquisition device 131B, serving as the acquisition source of the control information, via the communication unit 41 and the security network 20.

For example, when an abnormality is detected by the management device 121, the data acquisition device 131B performs control related to the control network 10.

More specifically, the receiver 33 in the data acquisition device 131B receives the abnormality notification transmitted from the management device 121 via the wire harness 23, and outputs the received abnormality notification to the processor 35 in the acquisition unit 31.

[Control Example 1]

The processor 35 turns off the switch 34 in accordance with the abnormality notification received from the receiver 33, so as to perform, for example, control for cutting off the control unit 111B serving as the functional unit 111 indicated in the abnormality notification from the control network 10.

More specifically, the processor 35 turns off the switch 34 to block the path used for transmitting control information from the control unit 111B toward the drive unit 111C in the data acquisition device 131B.

Accordingly, the control information becomes non-transmittable to the drive unit 111C, so that power steering becomes non-usable in the vehicle 1. However, the driver of the vehicle 1 can continue to drive the vehicle 1 since the steering operation itself is still possible.

[Control Example 2]

For example, the processor 35 may be configured to perform control for switching paths in the control network 10 in accordance with the abnormality notification received from the receiver 33.

Figure 9:
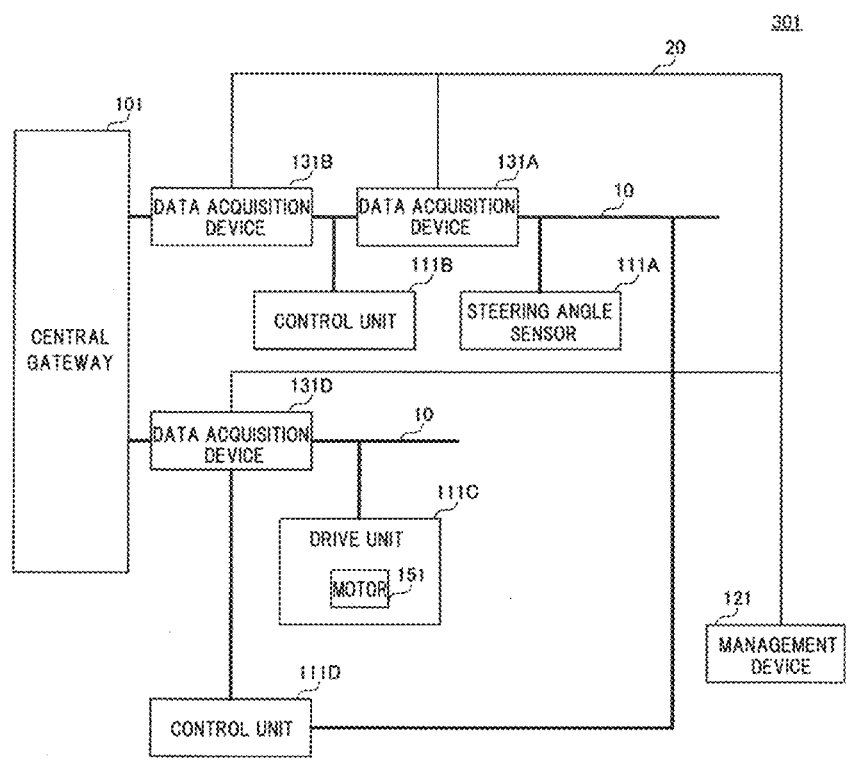
FIG. 9 illustrates another example of a partial configuration of the vehicle-mounted communication system according to the first embodiment of the present invention.

FIG. 9 illustrates another example of a partial configuration of the vehicle-mounted communication system according to the first embodiment of the present invention.

As compared with the vehicle-mounted communication system 301 shown in FIG. 2, the vehicle-mounted communication system 301 shown in FIG. 9 further includes a spare control unit 111D, and also includes a data acquisition device 131D, as one of the data acquisition devices 131, in place of the data acquisition device 131C.

The control unit 111D receives an abnormality notification transmitted from the management device 121 and indicating an abnormality in the control unit 111B, and starts performing operation.

More specifically, for example, the control unit 111D receives an abnormality notification transmitted from the management device 121 and indicating an abnormality in the control unit 111B, calculates a power-steering assistance amount based on sensor information received from the steering angle sensor 111A, and creates control information containing the direction, motor speed, and drive amount for controlling the rotation of the motor 151 based on the calculated assistance amount.

Then, the control unit 111D transmits the created control information to the drive unit 111C via the data acquisition device 131D.

Figure 10:
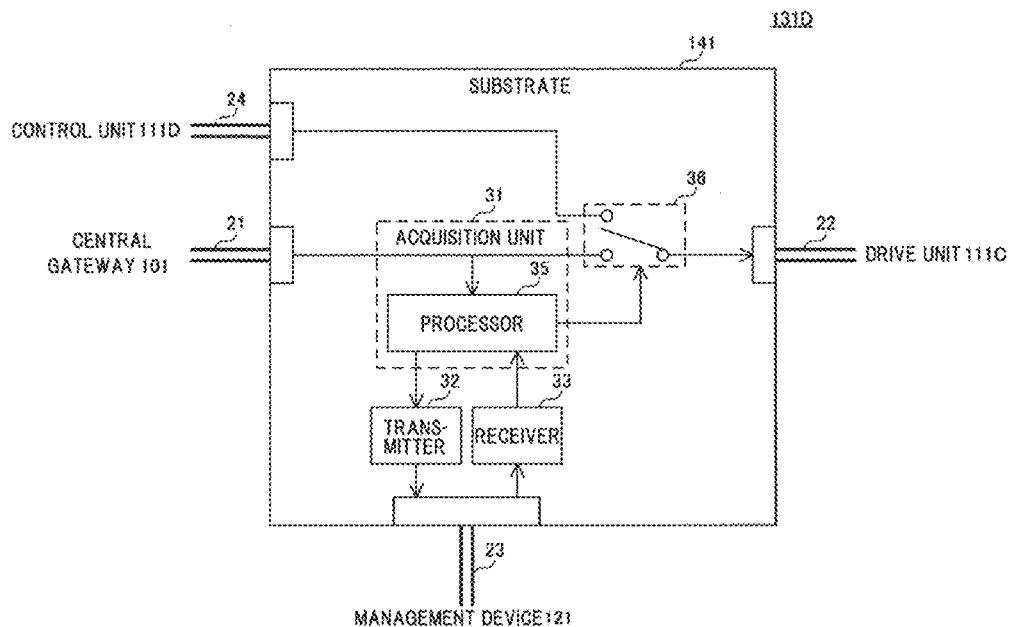
FIG. 10 illustrates another example of the configuration of each data acquisition device according to the first embodiment of the present invention.

FIG. 10 illustrates another example of the configuration of each data acquisition device according to the first embodiment of the present invention.

Referring to FIG. 10, as compared with the data acquisition device 131 shown in FIG. 3, the data acquisition device 131D further includes a switch 36 provided in place of the switch 34 and connected to the control unit 111D by a wire harness 24.

The switch 36 in the data acquisition device 131D is connected between the wire harness 21 and the wire harness 22 as well as between the wire harness 21 and the wire harness 24.

The switch 36 switches between a mode for connecting the wire harness 22 to the wire harness 21 and a mode for connecting the wire harness 22 to the wire harness 24 in accordance with control of the processor 35.

In the normal state, the processor 35 controls the switch 36 such that the connection destination for the wire harness 22 is the wire harness 21.

Accordingly, in the normal state, control information from the wire harness 21 is transmitted to the wire harness 22. Specifically, control information transmitted from the control unit 111B is transmitted to the drive unit 111C via the data acquisition device 131B, the central gateway 101, the wire harness 21, the switch 36, and the wire harness 22.

The processor 35 controls the switch 36 in accordance with the abnormality notification received from the receiver 33 such that the connection destination for the wire harness 22 is the wire harness 24. Accordingly, control information transmitted from the control unit 111D is transmitted to the drive unit 111C via the wire harness 24, the switch 36, and the wire harness 22.

The data acquisition device 131 may be connected between the steering angle sensor 111A and the control unit 111D.

Furthermore, the data acquisition device 131 may be configured to include a relay unit in place of the switch 34 or the switch 36. In this case, the processor 35 controls a relay in accordance with the abnormality notification received from the receiver 33.

Moreover, the data acquisition device 131 may be configured not to include the switch 34 or the switch 36. In this case, for example, the vehicle-mounted communication system 301 includes a junction box containing a plurality of switches corresponding to the switch 34 or the switch 36 in each data acquisition device 131. Each data acquisition device 131 controls the switches in the junction box so as to perform control related to the control network 10. The junction box may be configured to include the management device 121.

Furthermore, the management device 121 performs control for notifying a vehicle occupant of an abnormality when such an abnormality is detected.

More specifically, the processor 43 in the management device 121 transmits the created abnormality notification to a display control device, as a functional unit 111 having a function for displaying the abnormality notification on a screen on the dashboard of the vehicle 1, via the communication unit 41 and the security network 20.

The display control device receives the abnormality notification transmitted from the management device 121 and performs a process for displaying the screen for notifying the vehicle occupant of the abnormality on, for example, a display on the dashboard of the vehicle 1 in accordance with the received abnormality notification.

Furthermore, for example, the processor 43 transmits the created abnormality notification mentioned above to an external communication device, such as a TCU, as a functional unit 111 capable of communicating wirelessly with a server outside the vehicle 1, via the communication unit 41.

The external communication device receives the abnormality notification transmitted from the management device 121 and transmits the received abnormality notification to a server set at a security operation center via a wireless base station by including the abnormality notification in a wireless signal compliant with a communication standard, such as LTE (Long Term Evolution) or 3G.

Accordingly the contents of the abnormality indicated in the abnormality notification are visualized at the security operation center, so that an operator can cope with the abnormality.

[Flow of Operation]

The devices in the vehicle-mounted communication system are each equipped with a computer that includes a memory. An arithmetic processor, such as a CPU, in the computer reads a program partially or entirely containing the steps of a following sequence diagram or flowchart from the memory and executes the program. The program for each of these plurality of devices can be installed from an external source. The program for each of these plurality of devices is distributed in a state where the program is stored in a storage medium.

Figure 11:
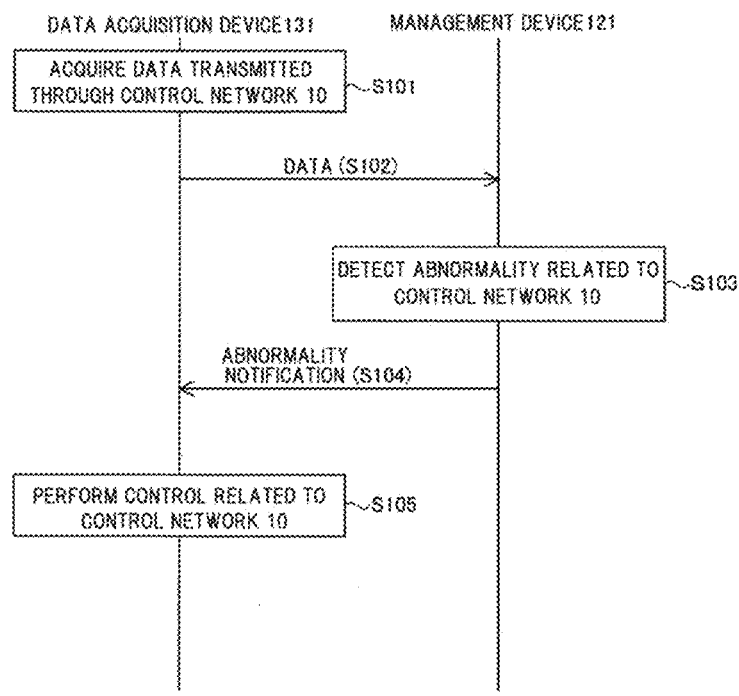
FIG. 11 illustrates an example of a sequence of abnormality detection and abnormality-related processing in a vehicle-mounted communication system according to the first embodiment of the present invention.

FIG. 11 illustrates an example of a sequence of abnormality detection and abnormality-related processing in a vehicle-mounted communication system according to the first embodiment of the present invention. FIG. 11 representatively illustrates the operation of one management device 121 and the operation of one of the data acquisition devices 131.

Referring to FIG. 11, the data acquisition device 131 first acquires data, such as sensor information and control information, transmitted through the control network 10 (step S101).

Then, the data acquisition device 131 transmits the acquired data to the management device 121 (step S102).

Subsequently, the management device 121 receives the data transmitted from the data acquisition device 131 and detects an abnormality related to the control network 10 based on the received data (step S103).

Then, if the management device 121 detects an abnormality related to the control network 10, the management device 121 creates an abnormality notification indicating the abnormality, and transmits the created abnormality notification to the data acquisition device 131 (step S104).

Subsequently, the data acquisition device 131 receives the abnormality notification transmitted from the management device 121, and performs control related to the control network 10, such as control for cutting off the functional unit 111 detected as being abnormal from the control network 10 and control for switching paths in the control network 10, in accordance with the received abnormality notification (step S105).

[Modification 1]

Figure 12:
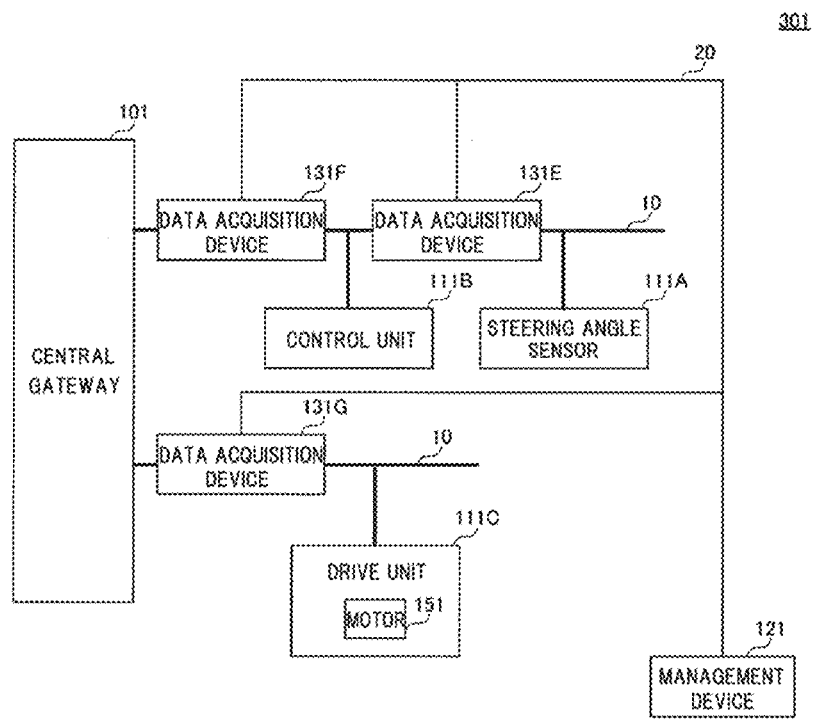
FIG. 12 illustrates a partial configuration in modification 1 of the vehicle-mounted communication system according to the first embodiment of the present invention.

FIG. 12 illustrates a partial configuration in modification 1 of the vehicle-mounted communication system according to the first embodiment of the present invention.

Referring to FIG. 12, the vehicle-mounted communication system 301 according to modification 1 includes data acquisition devices 131E, 131F, and 131G, as data acquisition devices 131, in place of the data acquisition devices 131A, 131B, and 131C, as compared with the vehicle-mounted communication system 301 shown in FIG. 2. The data acquisition devices 131E, 131F, and 131G may also be referred to as data acquisition devices 131 hereinafter.

When the management device 121 detects an abnormality, the management device 121 controls the functional units 111 via the data acquisition devices 131.

When the management device 121 detects an abnormality, the management device 121 changes the operation of the functional units 111 toward the safer side for the running of the vehicle 1.

More specifically, when the management device 121 detects an abnormality in a functional unit 111, the management device 121 controls another functional unit 111 that corresponds to the functional unit 111 detected as being abnormal.

In detail, when the management device 121 detects an abnormality in the control unit 111B, the management device 121 performs control for stopping the supply of electric power to the drive unit 111C that is to receive control information from the control unit 111B.

Figure 13:
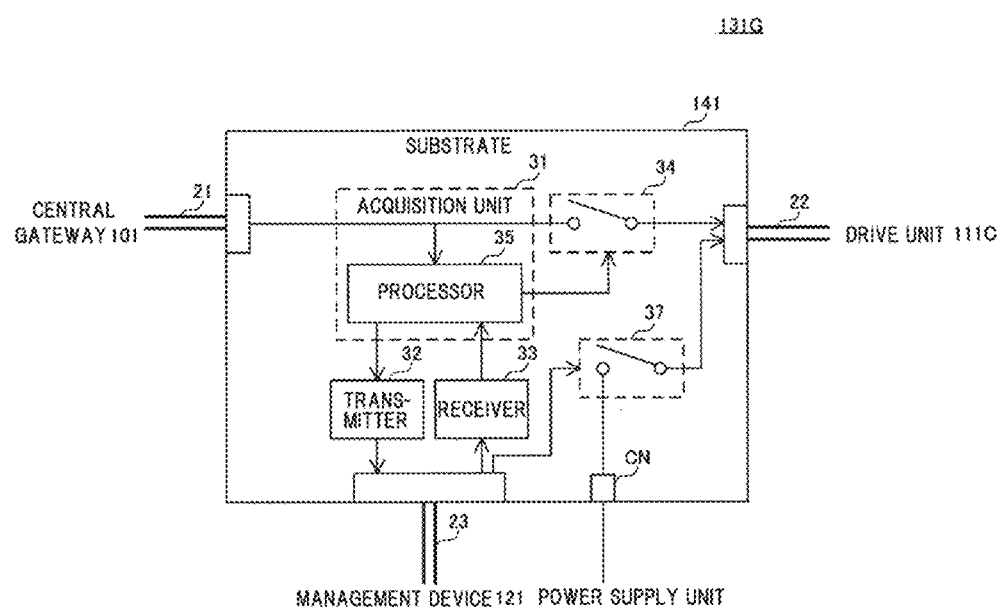
FIG. 13 illustrates an example of the configuration of each data acquisition device in modification 1 of the vehicle-mounted communication system according to the first embodiment of the present invention.

FIG. 13 illustrates an example of the configuration of each data acquisition device in modification 1 of the vehicle-mounted communication system according to the first embodiment of the present invention.

Referring to FIG. 13, the data acquisition device 131G further includes a switch 37, as compared with the data acquisition device 131 shown in FIG. 3.

For example, the data acquisition device 131G is supplied with electric power from a power supply unit (not shown) via a dedicated cable. The electric power from the power supply unit may be supplied to the data acquisition device 131 via any of the wire harnesses 21 to 23.

The switch 37 is connected between a connector CN, which is supplied with the electric power from the power supply unit, and the wire harness 22.

For example, the data acquisition device 131G supplies the electric power from the power supply unit (not shown) to the corresponding functional unit 111 via the switch 37 and the wire harness 22 or via the switch 37 and a cable different from the wire harness 22.

Referring to FIGS. 12 and 13, the management device 121 controls the switch 37 in the data acquisition device 131 so as to switch between a mode for supplying electricity to the corresponding functional unit 111 and a mode for not supplying electricity thereto.

More specifically, the switch 37 switches between a mode for connecting the connector CN and the wire harness 22 to each other and a mode for not connecting connector CN and the wire harness 22 to each other in accordance with control of the management device 121.

In the normal mode, the processor 35 turns on the switch 37 to connect the connector CN and the wire harness 22 to each other. Accordingly, the electric power from the power supply unit is transmitted to the wire harness 22.

In detail, when an abnormality in the control unit 111B is detected, the processor 43 in the management device 121 creates a switch command for switching the switch 37 in the data acquisition device 131G and transmits the created switch command to the switch 37 in the data acquisition device 131G via the communication unit 41 and the wire harness 23, so as to turn off the switch 37 in the data acquisition device 131G.

Alternatively, for example, the processor 43 may transmit the switch command to the switch 37 in the data acquisition device 131G via a cable different from the wire harness 23.

Accordingly, the supply of electric power to the motor 151 in the drive unit 111C is stopped so that the effect of illegal control information can be eliminated, thereby, for example, preventing a malfunction of the drive unit 111C caused by illegal control information and causing the vehicle 1 to run on the safer side. In the vehicle 1, power steering becomes non-usable. However, the driver of the vehicle 1 can continue to drive the vehicle 1 since the steering operation itself is still possible.

Alternatively, when the management device 121 detects an abnormality in a functional unit 111, the management device 121 may be configured to control the functional unit 111 detected as being abnormal instead of being configured to control another functional unit 111 that corresponds to the functional unit 111 detected as being abnormal.

In detail, for example, when the management device 121 detects an abnormality in the control unit 111B, the management device 121 may control the control unit 111B.

Figure 14:
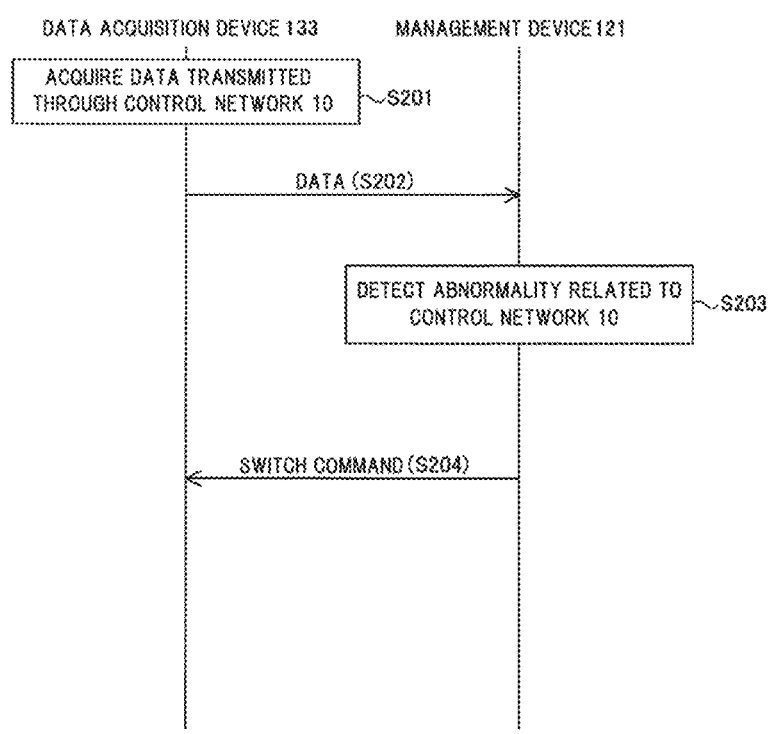
FIG. 14 illustrates an example of a sequence of abnormality detection and abnormality-related processing in modification 1 of the vehicle-mounted communication system according to the first embodiment of the present invention.

FIG. 14 illustrates a sequence of abnormality detection and abnormality-related processing in modification 1 of the vehicle-mounted communication system according to the first embodiment of the present invention. FIG. 14 representatively illustrates the operation of one management device 121 and the operation of one of the data acquisition devices 131.

Referring to FIG. 14, the data acquisition device 131 first acquires data, such as sensor information and control information, transmitted through the control network 10 (step S201).

Then, the data acquisition device 131 transmits the acquired data to the management device 121 (step S202).

Subsequently, the management device 121 receives the data transmitted from the data acquisition device 131 and detects an abnormality related to the control network 10 based on the received data (step S203).

Then, when the management device 121 detects an abnormality related to the control network 10, the management device 121 creates a switch command for controlling the functional unit 111 corresponding to the abnormality, and transmits the created switch command to the data acquisition device 131, thereby controlling the relevant functional unit 111 (step S204).

[Modification 2]

The management device 121 may be configured to directly control the functional units 111 instead of being configured to control the functional units 111 via the data acquisition devices 131.

Figure 15:
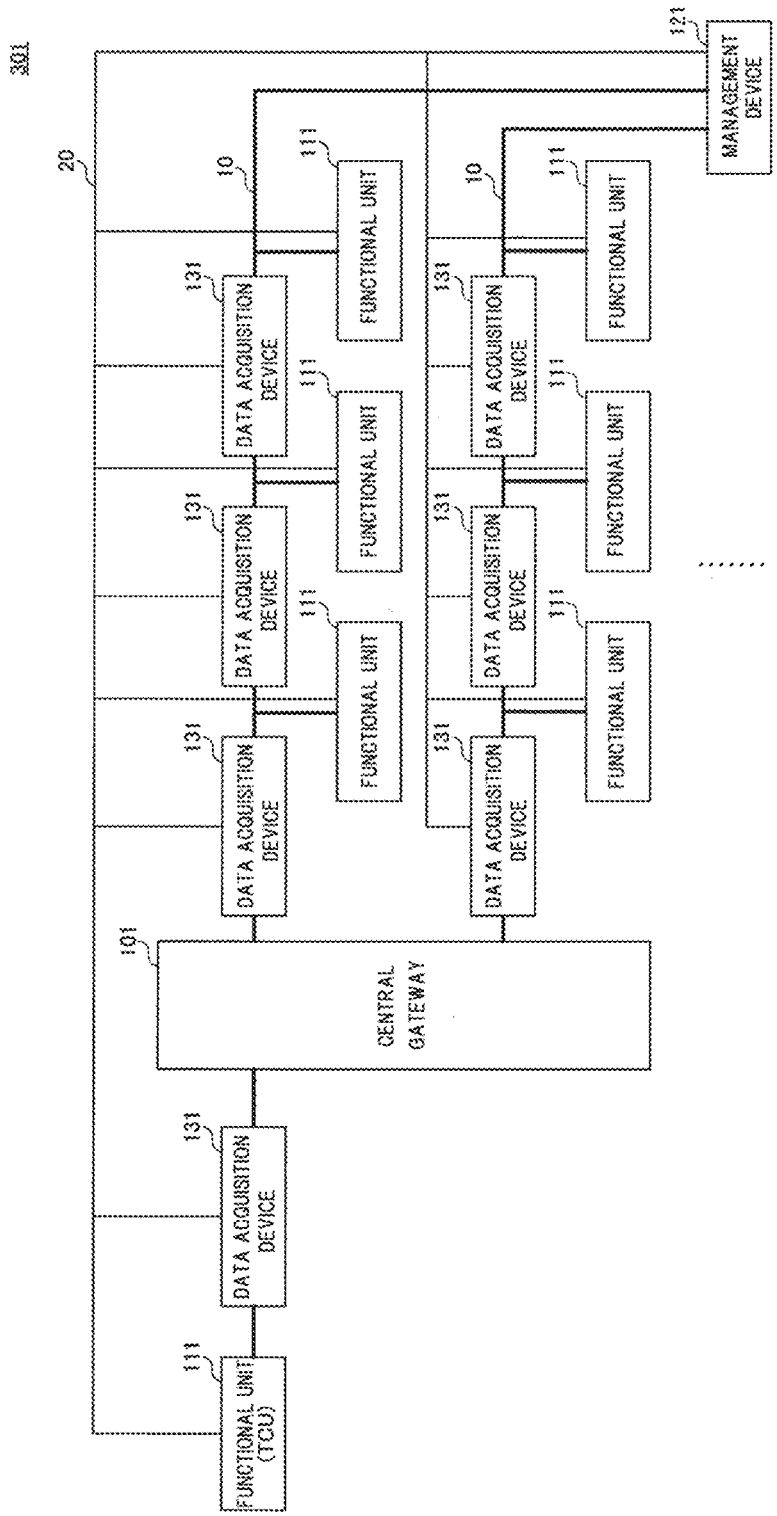
FIG. 15 illustrates the configuration of modification 2 of the vehicle-mounted communication system according to the first embodiment of the present invention.

FIG. 15 illustrates the configuration of modification 2 of the vehicle-mounted communication system according to the first embodiment of the present invention.

Referring to FIG. 15, the vehicle-mounted communication system 301 according to modification 2 includes the central gateway 101, the plurality of functional units 111, the management device 121, and the plurality of data acquisition devices 131.

The central gateway 101 and the functional units 111 are connected to each other by the control network 10.

The management device 121 is connected to the central gateway 101, the functional units 111, and the data acquisition devices 131 by the security network 20.

Each functional unit 111 includes a switch (not shown) equivalent to the switch 37 in each data acquisition device 131.

The management device 121 controls the switch included in each functional unit 111. More specifically, for example, when an abnormality in a functional unit 111 is detected, the processor 43 in the management device 121 creates a switch command and transmits the created switch command to the functional unit 111 via the communication unit 41 and the security network 20, thereby turning off the switch in the functional unit 111.

In the vehicle-mounted communication system according to the first embodiment of the present invention, when the management device 121 detects an abnormality, the management device 121 is configured to change the operation of the functional units 111 toward the safer side for the running of the vehicle 1 so as to allow the vehicle 1 to continue running. However, the configuration is not limited to this. When the management device 121 detects an abnormality, for example, the management device 121 may be configured to change the operation of the functional units 111 to cause the vehicle 1 to stop running.

Furthermore, in the vehicle-mounted communication system according to the first embodiment of the present invention, when the management device 121 detects an abnormality, the management device 121 is configured to perform control for notifying the vehicle occupant of the abnormality. However, the configuration is not limited to this. When the management device 121 detects an abnormality, the management device 121 may be configured not to provide an abnormality notification.

There is a demand for a technology that can establish a vehicle-mounted network with improved security over the technologies described in Patent Literature 1 and Patent Literature 2.

In this respect, in the vehicle-mounted communication system according to the first embodiment of the present invention, the plurality of functional units 111 are connected to the control network 10 in the vehicle 1. The management device 121 is connected to the security network 20 in the vehicle 1. The communication from the control network 10 to the security network 20 is partially limited. The data acquisition devices 131 acquire data transmitted through the control network 10 and transmit the data to the management device 121. The management device 121 detects an abnormality related to the control network 10 based on the data received from the data acquisition devices 131.

Accordingly, the communication is limited by isolating the control network 10 for transmitting information between the functional units 111 and the security network 20 for monitoring from each other, thereby detecting an abnormality in the vehicle 1 while achieving improved security by using the security network 20 in which the effect of the abnormality in the control network 10 is minimized. Moreover, with the management device 121 being configured to detect an abnormality, various types of abnormalities can be detected collectively in a single device.

Therefore, in the vehicle-mounted communication system according to the first embodiment of the present invention, a vehicle-mounted network with improved security can be established.

Furthermore, in the vehicle-mounted communication system according to the first embodiment of the present invention, each data acquisition device 131 performs control related to the control network 10 when an abnormality is detected by the management device 121.

With this configuration, for example, transmission of illegal data through the control network 10 can be prevented, thereby reducing the effect of the abnormality.

Furthermore, in the vehicle-mounted communication system according to the first embodiment of the present invention, the data acquisition devices 131 perform control for cutting off the functional units 111 from the control network 10 when an abnormality is detected by the management device 121.

According to this configuration, transmission paths for illegal data can be blocked. For example, transmission of illegal data from the functional unit 111 detected as being abnormal through the control network 10 can be prevented, and reception of illegal data by a normal functional unit 111 can be prevented.

Furthermore, in the vehicle-mounted communication system according to the first embodiment of the present invention, each data acquisition device 131 performs control for switching paths in the control network 10 when an abnormality is detected by the management device 121.

According to this configuration, for example, another transmission path is used in place of the transmission path corresponding to the detected abnormality, so that the vehicle-mounted communication system 301 can continue to perform normal operation.

Furthermore, in the vehicle-mounted communication system according to the first embodiment of the present invention, when the management device 121 detects an abnormality, the management device 121 controls the functional units 111.

According to this configuration, for example, the operation of the functional unit 111 detected as being abnormal can be stopped, or the operation of a normal functional unit 111 can be stopped to prevent the functional unit 111 from receiving illegal data, so that the effect of the abnormality can be reduced.

Furthermore, in the vehicle-mounted communication system according to the first embodiment of the present invention, when the management device 121 detects an abnormality, the management device 121 changes the operation of the functional units 111 toward the safer side for the running of the vehicle 1.

According to this configuration, a malfunction of a functional unit 111 caused as a result of receiving illegal data can be suppressed, thereby ensuring stable running of the vehicle 1.

Furthermore, in the vehicle-mounted communication system according to the first embodiment of the present invention, when the management device 121 detects an abnormality, the management device 121 performs control for providing an abnormality notification.

According to this configuration, for example, the driver of the vehicle 1 can recognize that inoperability is caused by an abnormality in the control network 10, so as to be able to ascertain the situation in detail.

Furthermore, in each data acquisition device according to the first embodiment of the present invention, the communication from the control network 10 to the security network 20 is partially limited. The acquisition unit 31 acquires data transmitted through the control network 10. The transmitter 32 transmits the data acquired by the acquisition unit 31 to the management device 121.

Accordingly, the communication is limited by isolating the control network for transmitting information between the functional units and the security network for monitoring from each other, thereby detecting an abnormality in the vehicle while achieving improved security by using the security network in which the effect of the abnormality in the control network is minimized. Consequently, a vehicle-mounted network with improved security can be established.

Therefore, with the data acquisition devices according to the first embodiment of the present invention, a vehicle-mounted network with improved security can be established.

Furthermore, each data acquisition device according to the first embodiment of the present invention is a connector that connects between paths in the control network 10.

According to this configuration, the data acquisition devices 131 can be readily retrofitted to, for example, a vehicle-mounted communication system equipped with existing functional units 111, and the functional units 111 can be simplified.

In the management device according to the first embodiment of the present invention, the communication unit 41 acquires data transmitted through the control network 10. The processor 43 detects an abnormality related to the control network 10 based on the data acquired by the communication unit 41.

Accordingly, the communication is limited by isolating the control network 10 for transmitting information between the functional units 111 and the security network 20 for monitoring from each other, thereby detecting an abnormality in the vehicle 1 while achieving improved security by using the security network 20 in which the effect of the abnormality in the control network 10 is minimized. Moreover, various types of abnormalities can be detected collectively in a single device.

Therefore, in the management device according to the first embodiment of the present invention, a vehicle-mounted network with improved security can be established.

In a monitoring method in the vehicle-mounted communication system according to the first embodiment of the present invention, data transmitted through the control network 10 is first acquired. Then, the acquired data is transmitted to the management device 121. Subsequently, the management device 121 detects an abnormality related to the control network 10 based on the received data.

Accordingly, the communication is limited by isolating the control network 10 for transmitting information between the functional units 111 and the security network 20 for monitoring from each other, thereby detecting an abnormality in the vehicle 1 while achieving improved security by using the security network 20 in which the effect of the abnormality in the control network 10 is minimized. Moreover, with the management device 121 being configured to detect an abnormality, various types of abnormalities can be detected collectively in a single device.

Therefore, in the monitoring method in the vehicle-mounted communication system according to the first embodiment of the present invention, a vehicle-mounted network with improved security can be established.

Next, another embodiment of the present invention will be described with reference to the drawings. In the drawings, identical or equivalent sections will be given the same reference signs, and the descriptions thereof will not be repeated.

Second Embodiment

This embodiment relates to a vehicle-mounted communication system in which the installation locations of the data acquisition devices are different from those in the vehicle-mounted communication system according to the first embodiment. Contents other than those to be described below are identical to those of the vehicle-mounted communication system according to the first embodiment.

Figure 16:
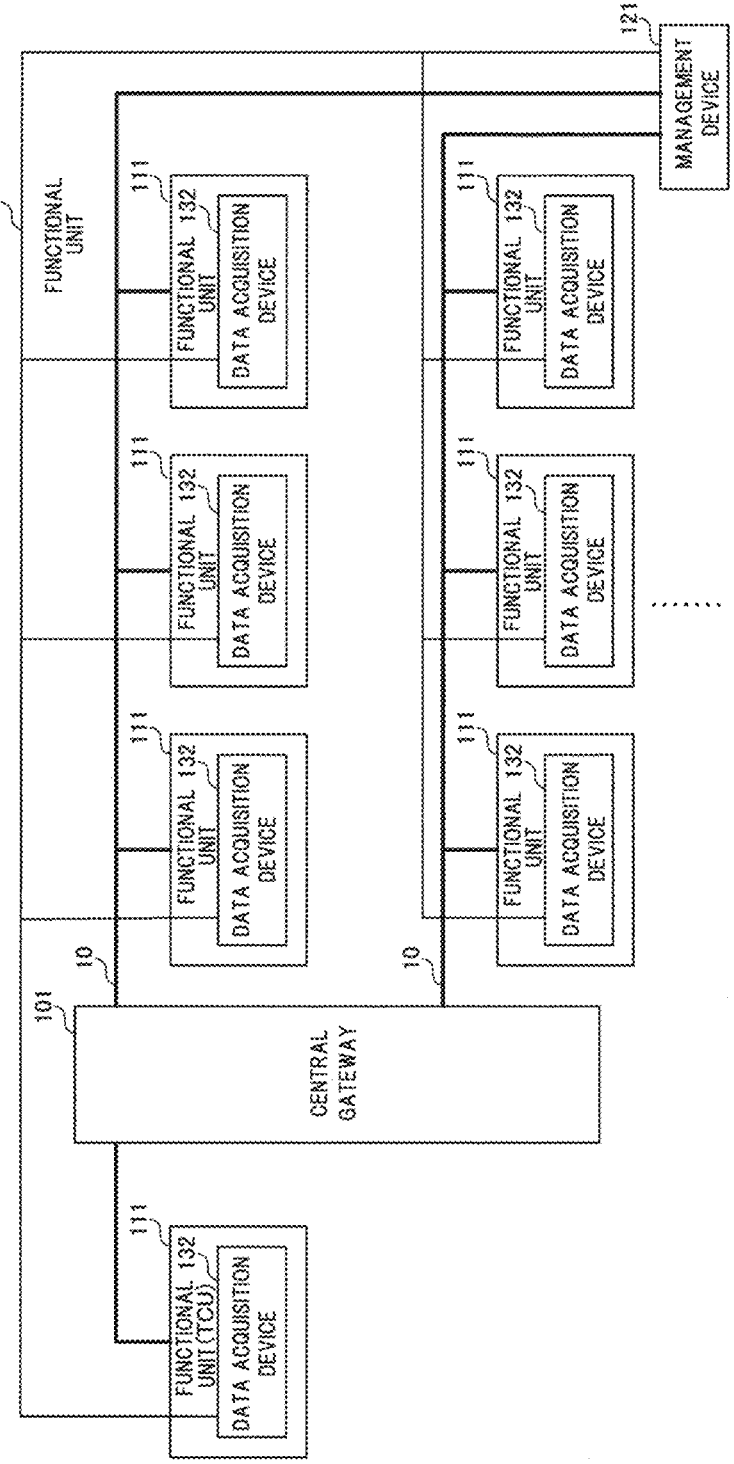
FIG. 16 illustrates an example of the configuration of a vehicle-mounted communication system according to a second embodiment of the present invention.

FIG. 16 illustrates an example of the configuration of a vehicle-mounted communication system according to a second embodiment of the present invention.

Referring to FIG. 16, a vehicle-mounted communication system 302 includes the plurality of functional units 111 and the management device 121. Each functional unit 111 includes a data acquisition device 132. The plurality of functional units 111 include, for example, the central gateway 101 and a TCU (telematics communication unit).

The vehicle-mounted communication system 302 is mounted in the vehicle 1. The plurality of functional units 111 excluding the central gateway 101 are connected to the central gateway 101 by the control network 10, such as a CAN (controller area network) (registered trademark) bus compliant with the CAN standard or an Ethernet (registered trademark) cable.

The management device 121 is connected to the data acquisition devices 132 by the security network 20.

Figure 17:
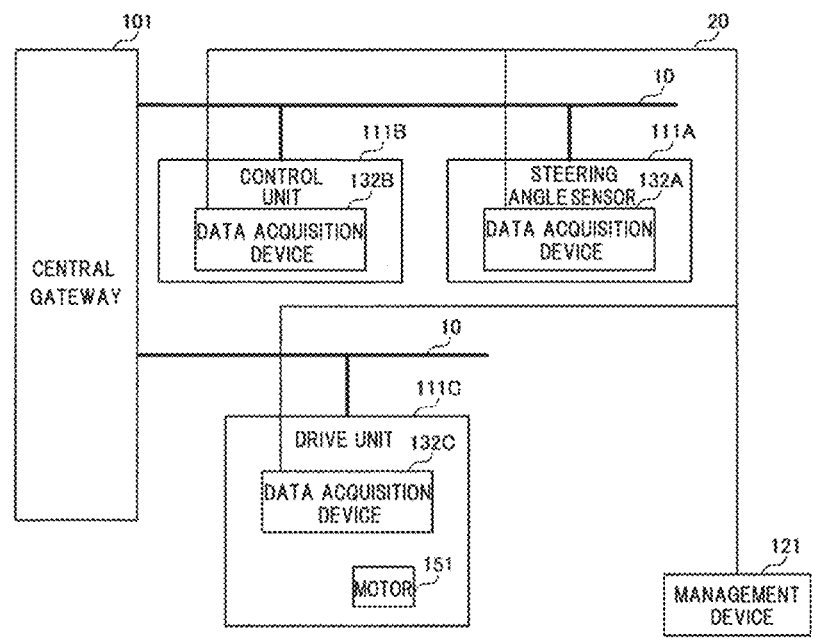
FIG. 17 illustrates an example of a partial configuration of the vehicle-mounted communication system according to the second embodiment of the present invention.

FIG. 17 illustrates an example of a partial configuration of the vehicle-mounted communication system according to the second embodiment of the present invention.

Referring to FIG. 17, the steering angle sensor 111A, the control unit 111B, and the central gateway 101 as examples of the functional units 111 are connected to one another by the control network 10.

Furthermore, the central gateway 101 and the drive unit 111C as examples of the functional units 111 are connected to each other by the control network 10. The drive unit 111C has the motor 151 for assisting with the steering operation.

Moreover, a data acquisition device 132A is included in the steering angle sensor 111A. A data acquisition device 132B is included in the control unit 111B. A data acquisition device 132C is included in the drive unit 111C.

Each data acquisition device 132 acquires data transmitted through the control network 10.

Figure 18:
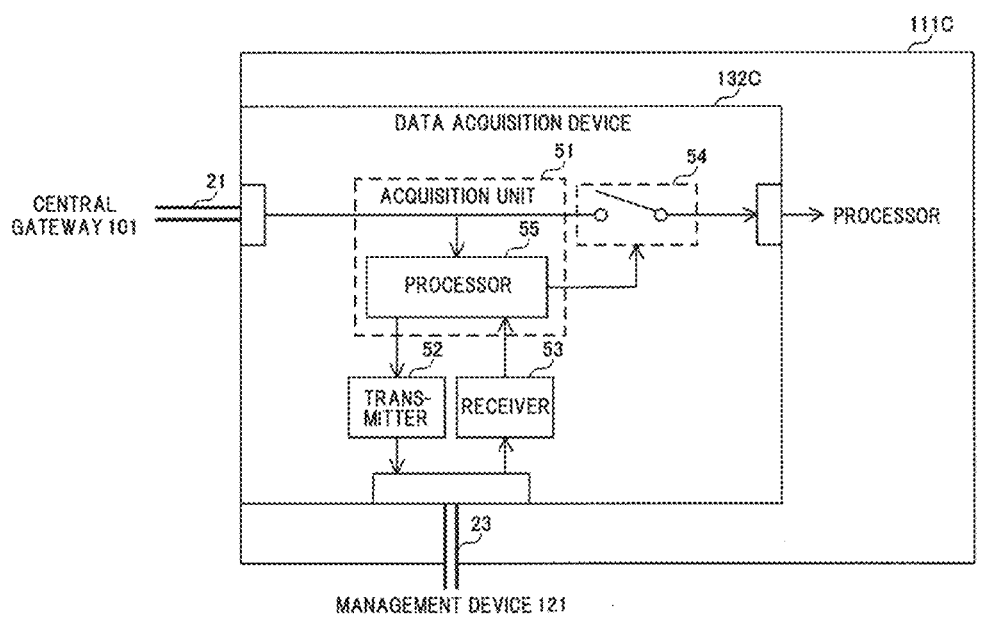
FIG. 18 illustrates an example of the configuration of each data acquisition device according to the second embodiment of the present invention.

FIG. 18 illustrates an example of the configuration of each data acquisition device according to the second embodiment of the present invention.

Referring to FIGS. 17 and 18, the data acquisition device 132C includes an acquisition unit 51, a transmitter 52, a receiver 53, and a switch 54. The acquisition unit 51 includes a processor 55. The data acquisition device 132C is connected to the central gateway 101 by the wire harness 21 used as the control network 10, and is connected to the management device 121 by the wire harness 23 used as the security network 20.

Control information transmitted from the control unit 111B is transmitted via the central gateway 101 to a processor (not shown) in, for example, the drive unit 111C via the wire harness 21 and the switch 54 in the data acquisition device 132C.

The switch 54 in the data acquisition device 132C is connected between the wire harness 21 and the processor in the drive unit 111C.

The switch 54 switches between a connected mode and a non-connected mode between the wire harness 21 and the processor in the drive unit 111C in accordance with control of the processor 55.

In the normal state, the processor 55 turns on the switch 54 to connect the wire harness 21 and the processor in the drive unit 111C to each other. Accordingly, the control information from the wire harness 21 is transmitted to the processor in the drive unit 111C.

The acquisition unit 51 in the data acquisition device 132C acquires the control information transmitted through the data acquisition device 132C between the wire harness 21 and the switch 54.

Then, the processor 55 in the acquisition unit 51 counts the number of pieces of control information acquired by the acquisition unit 51 within a predetermined time period.

Subsequently, the processor 55 detects an abnormality related to the control network 10 based on the acquired data.

More specifically, when the count value indicating the number of pieces of control information is larger than or equal to a predetermined threshold value, the processor 55 determines that the control unit 111B is abnormal. In other words, the processor 55 detects an abnormality in the control unit 111B and outputs the detection result to the transmitter 52.

The transmitter 52 transmits the detection result received from the processor 55 to the management device 121 via the wire harness 23.

The management device 121 receives the detection result transmitted from the transmitter 52 in the data acquisition device 132C via the wire harness 23 and performs a process according to the received detection result.

More specifically, the processor 43 in the management device 121 receives the detection result transmitted from the data acquisition device 132C via the wire harness 23 and the communication unit 41.

The processor 43 creates an abnormality notification indicating the abnormality in the control unit 111B based on the received detection result, and transmits the created abnormality notification to the data acquisition device 132C, serving as the acquisition source of the control information, via the communication unit 41 and the wire harness 23.

The receiver 53 in the data acquisition device 132C receives the abnormality notification transmitted from the management device 121 via the wire harness 23, and outputs the received abnormality notification to the processor 55 in the acquisition unit 51.

The processor 55 turns off the switch 54 in accordance with the abnormality notification received from the receiver 53, so as to perform control for cutting off the drive unit 111C serving as the functional unit 111 indicated in the abnormality notification from the control network 10.

More specifically, the processor 55 turns off the switch 54 to block the path used for transmitting control information from the control unit 111B toward the drive unit 111C in the data acquisition device 132C. Accordingly, the control information becomes non-transmittable to the processor in the drive unit 111C.

Figure 19:
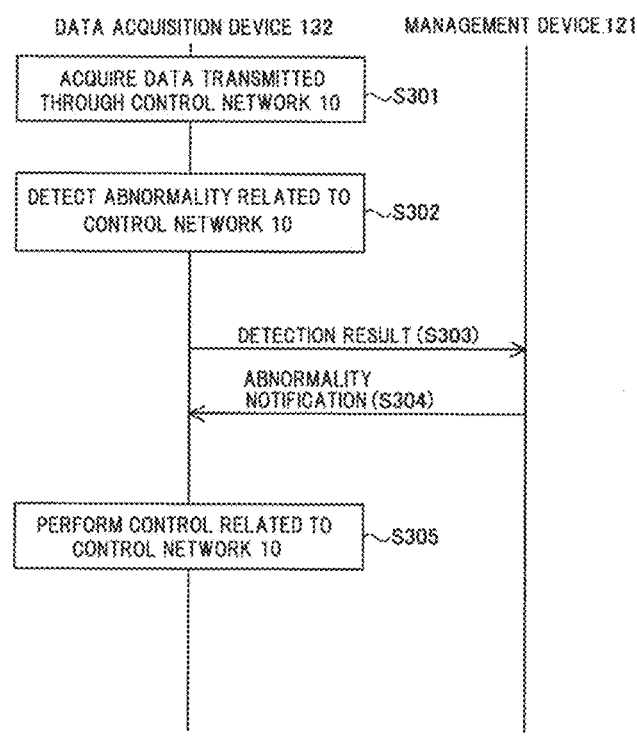
FIG. 19 illustrates an example of a sequence of abnormality detection and abnormality-related processing in a vehicle-mounted communication system according to the second embodiment of the present invention.

FIG. 19 illustrates an example of a sequence of abnormality detection and abnormality-related processing in a vehicle-mounted communication system according to the second embodiment of the present invention. FIG. 19 representatively illustrates the operation of one management device 121 and the operation of one of the data acquisition devices 132.

Referring to FIG. 19, the data acquisition device 132 first acquires data transmitted through the control network 10 (step S301).

Then, if the data acquisition device 132 detects an abnormality related to the control network 10 based on the acquired data (step S302), the data acquisition device 132 transmits the detection result to the management device 121 (step S303).

Subsequently, the management device 121 receives the detection result transmitted from the data acquisition device 132, creates an abnormality notification indicating the abnormality in the corresponding functional unit 111 in accordance with the received detection result, and transmits the created abnormality notification to the data acquisition device 132 (step S304).

Then, the data acquisition device 132 receives the abnormality notification transmitted from the management device 121, and performs control related to the control network 10, such as control for cutting off the functional unit 111 detected as being abnormal from the control network 10, in accordance with the received abnormality notification (step S305).

In the vehicle-mounted communication system according to the second embodiment of the present invention, the data acquisition device 132 is configured to perform control for cutting off the functional unit 111 indicated in the abnormality notification from the control network 10 as the control related to the control network 10. However, the configuration is not limited to this. The data acquisition device 132 may be configured to perform control for switching paths in the control network 10 as the control related to the control network 10.

Furthermore, in the vehicle-mounted communication system according to the second embodiment of the present invention, the management device 121 is configured to transmit an abnormality notification to the data acquisition device 132 as a process according to a detection result. However, the configuration is not limited to this. The management device 121 may be configured to control the functional unit 111 indicated in the detection result or another functional unit 111 corresponding to the functional unit 111 indicated in the detection result as the process according to the detection result.

In detail, in order to block the supply of electric power to the functional unit 111 indicated in the detection result, for example, the management device 121 may transmit, to the functional unit 111, a switch command for switching the switch included in the functional unit 111.

Accordingly, in the vehicle-mounted communication system according to the second embodiment of the present invention, the plurality of functional units 111 are connected to the control network 10 in the vehicle 1. Each data acquisition device 132 is communicable with the management device 121 connected to the security network 20 in the vehicle 1. In the vehicle-mounted communication system according to the second embodiment of the present invention, communication from the control network 10 to the security network 20 is partially limited. The data acquisition device 132 acquires data transmitted through the control network 10. The data acquisition device 132 is a connector that connects between paths in the control network 10 and detects an abnormality related to the control network 10 based on the acquired data.

Accordingly, the communication is limited by isolating the control network 10 for transmitting information between the functional units 111 and the security network 20 for monitoring from each other, thereby detecting an abnormality in the vehicle 1 while achieving improved security by using the security network 20 in which the effect of the abnormality in the control network 10 is minimized. Moreover, with each data acquisition device 132 being configured to detect an abnormality, the processing load in the vehicle-mounted communication system 301 can be distributed. Moreover, the data acquisition devices 132 can be readily retrofitted to, for example, a vehicle-mounted communication system equipped with existing functional units 111, and the functional units 111 can be simplified.

Accordingly, in the vehicle-mounted communication system according to the second embodiment of the present invention, a vehicle-mounted network with improved security can be established.

Furthermore, in the vehicle-mounted communication system according to the second embodiment of the present invention, the data acquisition devices 132 are included in the functional units 111.

According to such a configuration, the configuration of the vehicle-mounted communication system 301 can be simplified.

Furthermore, in a monitoring method in the vehicle-mounted communication system according to the second embodiment of the present invention, each data acquisition device 132 first acquires data transmitted through the control network 10. Then, the data acquisition device 132 detects an abnormality related to the control network 10 based on the acquired data.

Accordingly, the communication is limited by isolating the control network 10 for transmitting information between the functional units 111 and the security network 20 for monitoring from each other, thereby detecting an abnormality in the vehicle 1 while achieving improved security by using the security network 20 in which the effect of the abnormality in the control network 10 is minimized. Moreover, with each data acquisition device 132 being configured to detect an abnormality, the processing load in the vehicle-mounted communication system 301 can be distributed.

Therefore, in the monitoring method in the vehicle-mounted communication system according to the second embodiment of the present invention, a vehicle-mounted network with improved security can be established.

Since other components and operation are identical to those in the vehicle-mounted communication system according to the first embodiment, detailed descriptions will not be repeated here.

It should be regarded that the above embodiments are exemplary in all aspects and are not limitative. The scope of the present invention is indicated not by the above description but by the claims, and is intended to include all changes within the meaning and scope equivalent to the scope of the claims.

The above description includes the following additional features.

[Additional Item 1]

A vehicle-mounted communication system mounted in a vehicle, comprising: a plurality of functional units connected to a control network in the vehicle; and a management device connected to a security network in the vehicle, wherein communication from the control network to the security network is partially limited, wherein the vehicle-mounted communication system further comprises:

a data acquisition device that acquires data transmitted through the control network and transmits the data to the management device, wherein the management device detects an abnormality related to the control network based on the data received from the data acquisition device, and wherein the data acquisition device acquires the data and transmits the data to the management device via the security network.

[Additional Item 2]

A vehicle-mounted communication system mounted in a vehicle, comprising:

a plurality of functional units connected to a control network in the vehicle; and a data acquisition device that is communicable with a management device connected to a security network in the vehicle and that acquires data transmitted through the control network, wherein communication from the control network to the security network is partially limited, wherein the data acquisition device is a connector that connects between paths in the control network and detects an abnormality related to the control network based on the acquired data, and wherein the data acquisition device transmits a detection result to the management device via the security network.

[Additional Item 3]

A data acquisition device in a vehicle-mounted communication system mounted in a vehicle, the vehicle-mounted communication system having a plurality of functional units connected to a control network and a management device connected to a security network, wherein communication from the control network to the security network is partially limited, wherein the data acquisition device comprises:

an acquisition unit that acquires data transmitted through the control network; and a transmitter that transmits the data acquired by the acquisition unit to the management device, and wherein the transmitter transmits the data to the management device via the security network.

[Additional Item 4]

A management device in a vehicle-mounted communication system mounted in a vehicle, the management device being connected to a security network, wherein, in the vehicle, a plurality of functional units are connected to a control network and communication from the control network to the security network is partially limited, the management device comprising:

a communication unit that acquires data transmitted through the control network; and a processor that detects an abnormality related to the control network based on the data acquired by the communication unit, wherein the communication unit acquires data transmitted via the security network.

REFERENCE SIGNS LIST 10 control network
20 security network
21, 22, 23, 24 wire harness
31, 51 acquisition unit
32, 52 transmitter
33, 53 receiver
34, 36, 37, 54 switch
35, 43, 55 processor
41 communication unit
42 storage unit
101 central gateway
111 functional unit
121 management device
131, 132 data acquisition device
141 substrate
301, 302 vehicle-mounted communication system

The invention claimed is:

1. A vehicle-mounted communication system mounted in a vehicle, comprising:
   a plurality of functional units connected to a control network in the vehicle,
   a management device connected to a security network in the vehicle; and
   a data acquisition device that acquires data transmitted through the control network and transmits the data to the management device,
   wherein communication from the control network to the security network is partially limited, and
   wherein the management device comprising a processor which detects an abnormality related to the control network based on the data received from the data acquisition device.

2. The vehicle-mounted communication system according to claim 1,
   wherein the data acquisition device performs control related to the control network when an abnormality is detected by the management device.

3. The vehicle-mounted communication system according to claim 2,
   wherein the data acquisition device performs control for cutting off each functional unit from the control network when the abnormality is detected by the management device.

4. The vehicle-mounted communication system according to claim 2,
   wherein the data acquisition device performs control for switching paths in the control network when the abnormality is detected by the management device.

5. The vehicle-mounted communication system according to claim 1,
   wherein the management device controls each functional unit when the abnormality is detected.

6. The vehicle-mounted communication system according to claim 5,
   wherein the management device changes operation of each functional unit toward a safer side for running of the vehicle when the abnormality is detected.

7. The vehicle-mounted communication system according to claim 1,
   wherein the management device performs control for providing a notification about the abnormality when the abnormality is detected.

8. A vehicle-mounted communication system mounted in a vehicle, comprising:
   a plurality of functional units connected to a control network in the vehicle; and
   a data acquisition device that is communicable with a management device connected to a security network in the vehicle and that acquires data transmitted through the control network,
   wherein communication from the control network to the security network is partially limited;
   wherein the data acquisition device is a connector that connects between paths in the control network and detects an abnormality related to the control network based on the acquired data.

9. A data acquisition device in a vehicle-mounted communication system mounted in a vehicle, the vehicle-mounted communication system having a plurality of functional units connected to a control network and a management device connected to a security network,
   wherein communication from the control network to the security network is partially limited,
   wherein the data acquisition device comprises:
   an acquisition unit that acquires data transmitted through the control network; and
   a transmitter that transmits the data acquired by the acquisition unit to the management device.

10. The data acquisition device according to claim 9,
    wherein the data acquisition device is a connector that connects between paths in the control network.

11. The data acquisition device according to claim 9,
    wherein the data acquisition device is included in each functional unit.

12. A management device in a vehicle-mounted communication system mounted in a vehicle, the management device being connected to a security network, wherein, ire the vehicle, a plurality of functional units are connected to a control network and communication from the control network to the security network is partially limited, the management device comprising:
    a communication unit that acquires data transmitted through the control network; and
    a processor that detects an abnormality related to the control network based on the data acquired by the communication unit, wherein the management device controls each functional unit when the abnormality is detected.

13. The management device according to claim 12,
    wherein the management device performs control for cutting off each functional unit from the control network when the abnormality is detected by the management device.

14. A monitoring method in a vehicle-mounted communication system mounted in a vehicle, the vehicle-mounted communication system including a plurality of functional units connected to a control network in the vehicle and a management device connected to a security network in the vehicle,
    wherein communication from the control network to the security network is partially limited, and
    wherein the monitoring method comprises:
    acquiring data transmitted through the control network;
    transmitting the acquired data to the management device; and
    performed by the management device for detecting an abnormality related to the control network based on the received data.

15. A monitoring method in a vehicle-mounted communication system mounted in a vehicle, the vehicle-mounted communication system including a plurality of functional units connected to a control network in the vehicle and a data acquisition device communicable with a management device connected to a security network in the vehicle,
    wherein communication from the control network to the security network is partially limited,
    wherein the data acquisition device is a connector that connects between paths in the control network, and
    wherein the monitoring method comprises:
    acquiring by the data acquisition device data transmitted through the control network; and
    detecting by the data acquisition device an abnormality related to the control network based on the acquired data.

* * * * *